United States Patent
Mitchell

[15] 3,695,100
[45] Oct. 3, 1972

[54] FORCE MEASURING AND INDICATING APPARATUS

[72] Inventor: Wallace F. Mitchell, 916 West Campbell St., Arlington Heights, Ill. 60005

[22] Filed: Oct. 5, 1970
[21] Appl. No.: 77,966

[52] U.S. Cl. .............................. 73/141 R, 177/208
[51] Int. Cl. ............................................... G01l 1/02
[58] Field of Search ...... 73/141 R, 419; 177/208, 254

[56] References Cited

UNITED STATES PATENTS

| | | |
|---|---|---|
| 1,507,242 | 9/1924 | Meriam ................. 177/208 X |
| 2,392,702 | 1/1946 | Saunders .................. 177/208 |
| 2,643,872 | 6/1953 | Wise ......................... 177/208 |
| 2,960,328 | 11/1960 | Tate ........................ 177/254 |
| 2,691,301 | 10/1954 | Guest ...................... 73/141 R |

Primary Examiner—Charles A. Ruehl
Attorney—Fidler, Patnaude & Lazo

[57] ABSTRACT

Force measuring and indicating apparatus includes a pressure indicating gauge, such as a Bourdon gauge, and a force responsive sending unit having a liquid containing piston chamber and a piston movable therein in proportion to the force of being measured. A fluid outlet is connected to the gauge, and a pair of check valves are connected in opposing directions between the outlet and the piston chamber to maintain a predetermined pressure to the gauge and to provide a substantially greater flow rate from the gauge to the piston chamber than in the opposite direction.

4 Claims, 2 Drawing Figures

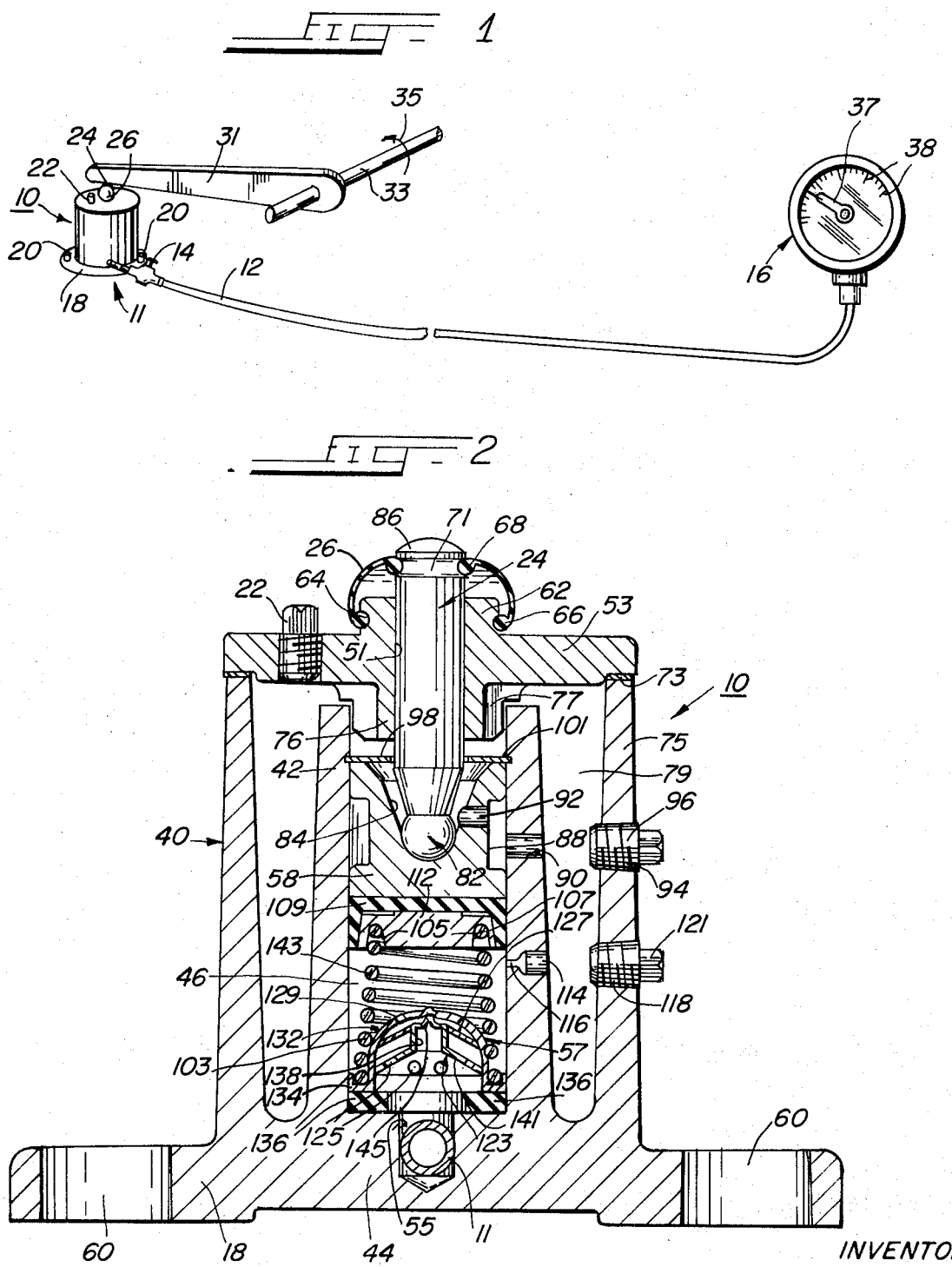

FORCE MEASURING AND INDICATING APPARATUS

The present invention relates to force measuring and indicating apparatus, and it more particularly relates to brake testing apparatus which includes a pressure indicator, such as a Bourdon gauge, and a hydraulic sending unit which enables the gauge to register a deflection of its needle in proportion to the magnitude of a force exerted on an actuator of the apparatus and which permits the needle of the gauge to return quickly to its initial position after the force is removed from the actuator so that a series of readings can be taken in rapid succession.

Bourdon gauges have for many years been employed to measure mechanical forces, and a hydraulic piston-cylinder can be used with such a gauge to measure the braking force of an automotive brake system. In this regard, a spring-loaded piston of the cylinder assembly is moved in response to the braking force of the automotive brake to be tested and thereby to exert a pressure on the hydraulic fluid in the cylinder to cause the gauge to register a deflection of its needle in proportion to the braking force of the brake under test. Such a testing apparatus would not be entirely satisfactory because of an undue and unwanted time delay between release of the brakes and return of the needle of the gauge to its initial position and because of the possible inaccuracy thereof. It would, however, be highly desirable to have a hydraulic sending unit which is adapted to cooperate with a pressure indicating gauge, such as a Bourdon gauge, which permits the gauge to rapidly return to its initial or zero deflection position after the force to be measured is removed from the sending unit so that subsequent measurements can be taken without an undue delay, and which maintains a positive pressure at the gauge at all times.

Thus, the principal object of the present invention is to provide a new and improved hydraulic sender for use with a pressure indicating gauge.

Another object of the present invention is to provide a new and improved brake testing apparatus including a force responsive, hydraulic sending unit, and a pressure indicating gauge, which apparatus permits the gauge to rapidly return to its initial or zero position after the force to be measured is removed from the sending apparatus.

Briefly, the above and further objects may be realized by providing a housing defining a pair of concentric chambers. The inner chamber is cylindrical, and a piston, responsive to a force applied thereto is reciprocably mounted therein to force hydraulic fluid through an outlet at one end of the inner chamber to which a Bourdon gauge is connected. In order to permit rapid response to the application and removal of forces on the piston, a valve assembly mounted over the outlet includes a pair of oppositely connected check valves, one of which has a substantially larger porting area than the other to permit rapid return of hydraulic fluid to the piston chamber when the force to be measured is released. A passageway connected between the two chambers maintains the piston chamber filled with hydraulic fluid whereby to insure accurate repeatability of the system.

The invention, both as to its organization and method of operation, together with further objects and advantages thereof will best be understood by reference to the following detailed description taken in connection with the accompanying sheet of drawings, wherein:

FIG. 1 is a partly schematic, fragmentary view of a pressure indicating system embodying a hydraulic sending apparatus of the present invention; and FIG. 2 is an enlarged, vertical cross-sectional view of the sending apparatus of FIG. 1.

Referring now to the drawing and particularly to FIG. 1 thereof, there is shown an hydraulic sending unit 10 having an outlet connected by a hose or line 12 and a shut-off valve 14 to a pressure-indicating gauge 16. The gauge 16 may be a conventional Bourdon gauge, and as shown, is remotely located relative to the sending unit 10. The sending unit 10 has a generally cylindrical housing with a base mounting flange 18 adapted to be fastened to a supporting surface by a pair of bolts 20. A pipe plug 22 having a vent hole therein is threadedly mounted in the top wall of the unit 10 and can be removed to permit filling of the unit 10 with an hydraulic fluid. An actuator plunger 24 has an external free end which is covered by a flexible dust cover or boot 26 and extends through an opening in the top wall of the unit 10 to serve as an actuator for the unit 10. A lever arm 31 fixed to the end of a shaft or torsion bar 33 engages the top of the plunger 24 to apply a force to the plunger 24 when the shaft 33 is rotated in the direction of the arrow 35. While the force exerted by the lever arm 31 on the plunger 24 may be proportional to the braking force applied by a vehicular braking system, it is to be understood that the sending unit 10 may be used in connection with the gauge 16 to measure forces applied to the plunger 24 by other means.

In operation, when the force is applied to the outer end of the plunger 24 by the lever arm 31, the plunger 24 moves downwardly into the interior of the unit 10 to exert a pressure on the fluid in the unit 10. The pressure exerted on the fluid is then transferred via the tube 12 to the gauge 16 to cause an indicating needle 37 thereof to deflect from its zero position (as shown in FIG. 1) relative to graduated markings 38 on the face of the gauge 16 to a position which is proportional to the force exerted on the plunger 24. When the lever arm 31 removes the force from the plunger 24 as the shaft 33 rotates in a direction opposite to the arrow 35, the plunger returns to its initial position and the indicating needle 37 rapidly returns to its initial or preset position, which position is greater than zero.

Considering now the hydraulic sender assembly 10 in greater detail with reference to FIG. 2 of the drawing, the unit 10 generally comprises a cup-shaped body 40 defining a generally cylindrical chamber into which an upstanding inner concentric tubular sleeve 42 extends. The sleeve 42 is integrally connected to the bottom wall 44 of the body 40 to define a centrally disposed piston chamber 46. The plunger 24 extends through a hole 51 in a cover 53 sealably secured over the body 40 and into the chamber 46 of the tubular projection 42. A bore 55 in the bottom wall 44 communicates with the chamber 46 and with the outlet port 11, and a valve assembly 57 is disposed in the chamber 46 over the bore 55 below a piston 58 which is adapted to be moved downwardly by the plunger 24, whereby depression of the plunger 24 forces the piston 58 downwardly to in turn force hydraulic fluid from the chamber 46 through the valve assembly 57 to the port 11 at a first flow rate as determined by the valve assembly 57 and permits fluid to return quickly to the chamber 46 through the valve assembly 57 at a second flow rate which is substantially increased over the first flow rate and which is also determined by the valve assembly 57.

The cover 53 has a boss 62 which is provided with an annular groove 64 receiving an internal annular bead 66 of the dust cover 26 for securing it between the cover 53 and the actuator rod 24. An upper internal annular bead 68 of the dust cover 26 fits in an annular groove 71 in the external outer end portion of the plunger 24 to seal the external outer end portion of the plunger 24 to the cover 53. A gasket 73 seals the cover 53 to the outer wall 70 of the housing, and an internal boss 76 on the cover 53 extends partially into the sleeve 42 to provide an elongated bearing surface for the plunger 24. In order to lubricate the plunger 24 and the piston 58, the boss 76 is provided with a series of passageways or slots 77 which permit the hydraulic fluid in the annular chamber surrounding the sleeve 42 to flow into the top of the sleeve 42.

The inner end 82 of the plunger 24 is in the shape of a three-quarter sphere and is seated in a conically shaped recess 84 in the top surface of the piston 58 so that the plunger 24 can move the piston 58 in a downward direction when a force is applied by the lever 31 on a rounded outer end portion 86 of the plunger 24. The piston 58 is provided with an external annular recess or groove 88 which communicates with the chamber outside the sleeve 42 via a hole 90. A hole 92 in the piston 58 connects the groove 88 with the conical recess 84. A hole 94 in the outer wall 75 in alignment with the hole 90 in the inner wall 42 permits access of a drill to enable the hole 90 to be drilled in the wall 42, and a square head type plug 96 is thereafter threaded into the hole 94 to seal the chamber 79. A retainer ring 98 through which extends the plunger 24 fits in an internal annular groove 101 of the sleevelike wall 42 to serve as a stop for the piston 58 during its return movement.

The lower end of a coil spring 103 is seated on the outside of the check valve assembly 57, and its upper end is seated in an annular groove or recess 105 of a cup 107 which fits in an outer cup-shaped rubber gasket 109 which in turn engages the bottom surface of the piston 58 whereby the spring 103 serves to bias the outer end 86 of the plunger 24 outwardly. The cup 107 is preferably composed of metal such as aluminum and has a central boss 112 which engages the rubber cup 109. A hole 114 in the inner wall 42 permits the fluid in the outer chamber to communicate with the inner chamber 46 below the upper position of the cup 109. The hole 114 has a reduced inner portion 116 which communicates with the inner chamber 46. When the plunger 24 moves the piston 58 and the rubber outer cup 109 downwardly, the cup 109 seals off the hole 114. A hole 118 in the outer wall 75 permits the hole 114 to be drilled, and a square head type plug 121 is thereafter threaded into the hole 118 to seal the chamber 79.

Considering now the check valve assembly 57 in greater detail, the assembly 57 generally comprises a bell-shaped valve member 123 provided with a plurality of apertures 129 in an outer cup-shaped member 132. The member 132 is provided with an outer peripheral flange 134 which serves as a seat for the lower end of the spring 103 and which seats against a gasket 136 which in turn rests on the bottom wall 44. The flexible valve member 127, which is preferably composed of rubber or the like material, is annular in shape and surrounds and is secured to a centrally disposed cup-shaped raised portion 138 of the bell-shaped member or partition 123. During the downward motion of the plunger 24 hydraulic fluid is forced down through the holes 129 to force the valve member 127 away from an intermediate flared side wall portion 141 of the bell-shaped member 123. The fluid thus passes around the edge of the valve element 127 and through the apertures 125 to the outlet connector 11. During the return movement of the plunger 24, the fluid from the line 12 re-enters the bore 55 and passes through the apertures 125 forcing the valve member 127 against the inner wall of the cup-shaped member 132 to block the apertures 129. In this regard, it should be noted that the outer edge of the valve member 127 engages the inner wall of the cup-shaped member 132 when the member 127 is unstressed. The fluid returns to the bore 55 only after the force to be measured is removed from the plunger 24 and the pressure exerted by the return fluid causes the valve member 127 to block the openings 129 and to lift the flange 141 away from the gasket 136 whereby to permit the returning fluid to quickly enter the chamber 46 so that the needle 37 of the gauge 16 rapidly returns to its initial present position, whereby repeated readings of the gauge 16 can be taken in rapid succession. It will be apparent that when the return pressure is balanced out by the force exerted on the valve member 132 by the spring 103, the valve member 132 closes whereby the line 12 and the gauge 16 remain pressurized. The advantage of this positive preset pressure in the gauge line is that the operator knows if the system is operating simply by applying a force to the sender, releasing it and observing the gauge. The gauge should show a small positive reading, which reading is, of course, determined by the force of the spring 103.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

What is claimed is:

1. A force indicating system comprising
    a pressure gauge having a fluid connection thereto,
    a force responsive hydraulic sender unit means connected to said fluid connection for increasing the hydraulic pressure in said gauge to a value proportional to the force exerted on said sender unit and for maintaining said pressure at a predetermined positive value upon removal of said force from said sender unit,
    said sender unit comprising
    a housing defining a chamber for retaining a quantity of hydraulic fluid,
    a piston mounted in said chamber,
    an outlet port at one end of said chamber, spring means biasing said piston to a first position remote from said port, a control member connected to said piston for moving it from said first position toward said port against the biasing force exerted by said spring means, and a valve assembly mounted over said outlet port and including a first check valve for passing fluid to said outlet at a first rate of flow and a second check valve for passing fluid from said outlet to said chamber at a second rate of flow, said second rate of flow substantially exceeding said first rate of flow.

2. A force indicating system as set forth in claim 1 wherein said valve assembly comprises a valve seat surrounding said outlet port, a first cup-shaped, apertured valve member biased into sealing engagement with said seat, an apertured partition in said first valve member, and a flexible, imperforate valve member interposed between said partition and the apertured portion of said first valve member whereby to prevent the flow of fluid through the apertures in said first valve member into said chambers.

3. A hydraulic sender unit comprising a housing defining first and second concentric chambers, a piston reciprocably mounted in one of said chambers, an outlet at one end of said one of said chambers, spring means biasing said piston into a first position, a control rod connected to said piston for moving said piston from said first position remote from said outlet toward said outlet, a passageway between said chambers and located so as to be open when said piston is in said first position and to be closed by said piston during movement thereof toward said outlet, a valve assembly mounted over said outlet in said one of said chambers, said valve assembly including a first check valve for passing hydraulic fluid from said one of said chambers to said outlet at a first flow rate, and a second check valve for passing hydraulic fluid from said outlet to said one of said chambers at a second flow rate, said second flow rate being substantially greater than said first flow rate.

4. A hydraulic sender unit as set forth in claim 3 wherein said piston has a resilient end portion for sealably closing said passageway when said piston is moved from said first position toward said outlet.

* * * * *